Feb. 19, 1929.
E. A. ENGLUND
1,702,468
MILKING MACHINE
Filed Nov. 15, 1926  3 Sheets-Sheet 1
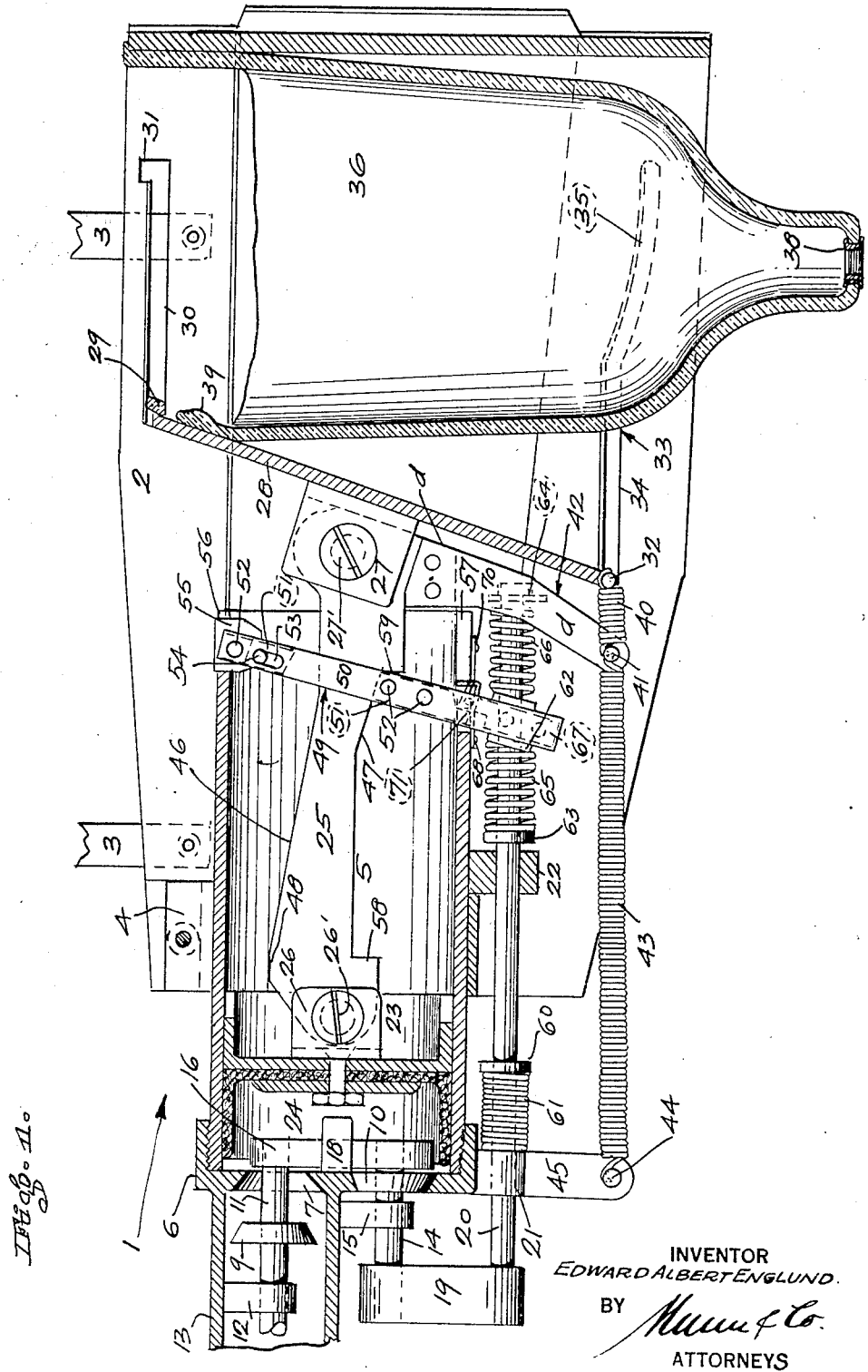
INVENTOR
EDWARD ALBERT ENGLUND.
BY
ATTORNEYS

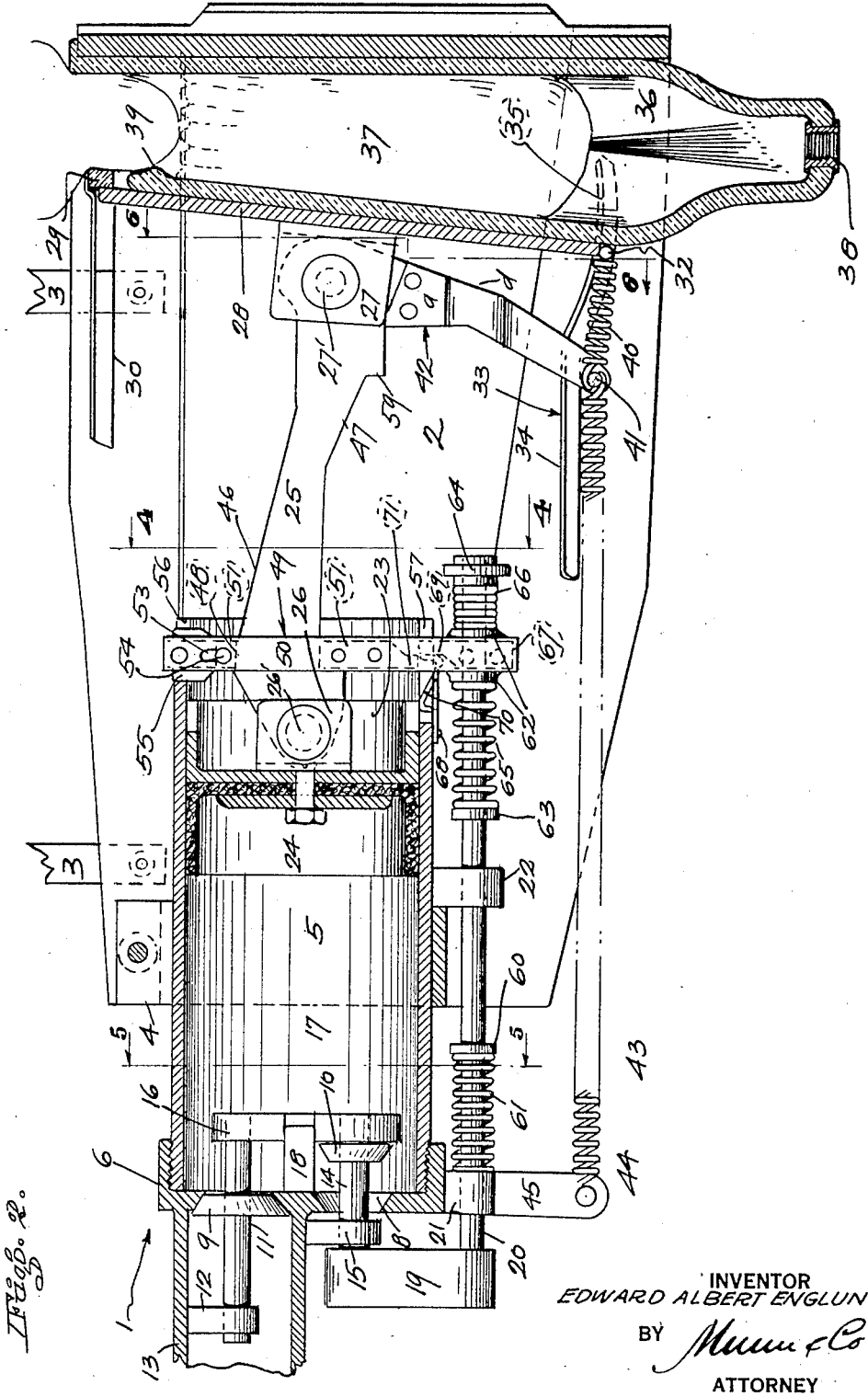

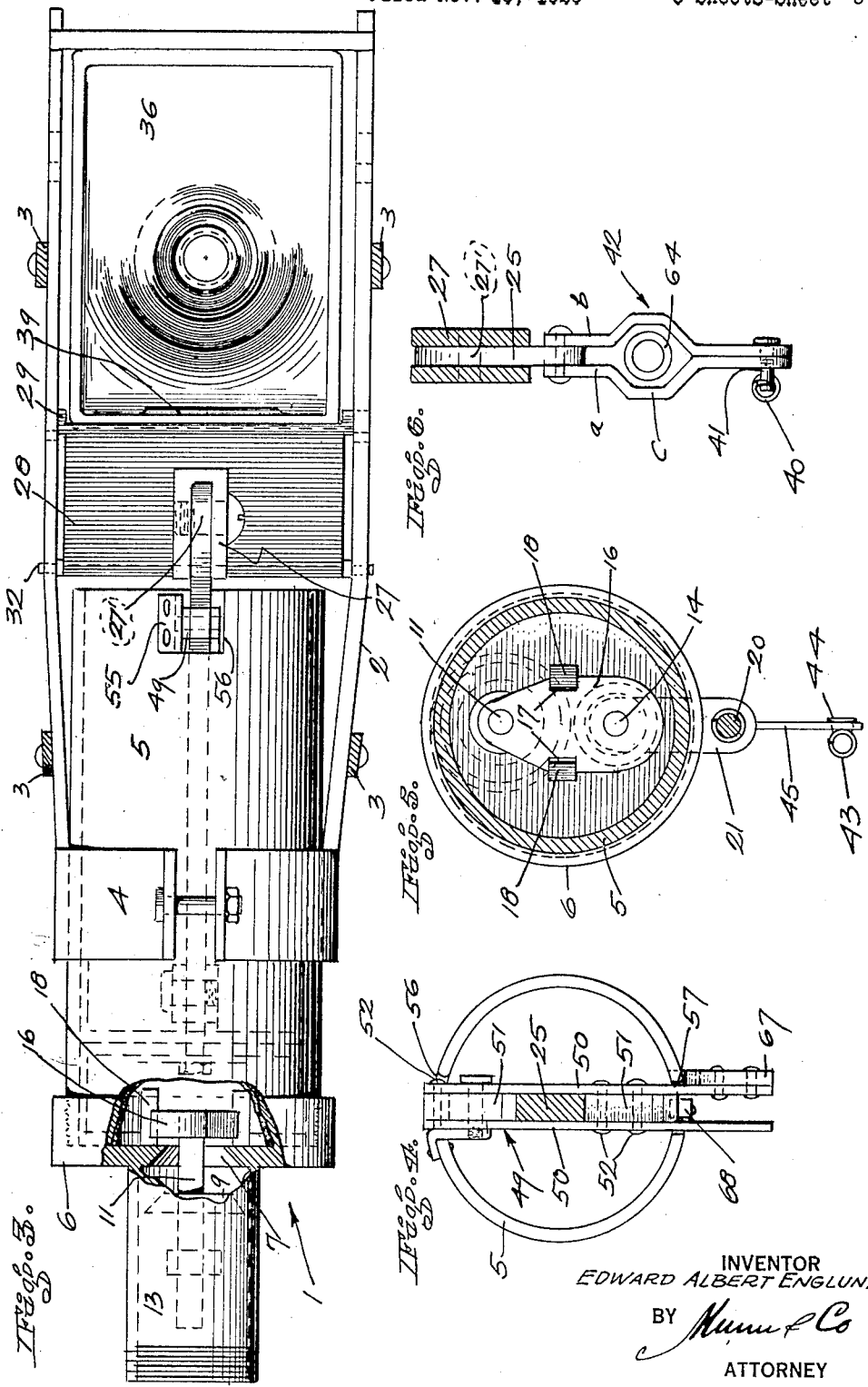

Patented Feb. 19, 1929.

1,702,468

UNITED STATES PATENT OFFICE.

EDWARD A. ENGLUND, OF HILLSBORO, OREGON.

MILKING MACHINE.

Application filed November 15, 1926. Serial No. 148,474.

My invention relates to machines adapted to be applied to milch animals, such as cows, for drawing milk from the teats of the animals by mechanical means.

A primary object of the invention is to construct a milking machine so that it may be attached to a milch animal for holding a teat therein, and to provide means for squeezing a quantity of milk from the teat without causing injury to the teat, or any other injury whereby the animal's health may be affected or the flow of milk reduced, as is frequently the case when suction is employed for drawing the milk.

Another important object of the invention is to provide a milking machine with means for squeezing the milk from the teats in such a manner that back-flow, which may cause the animal to be temporarily non-yielding of milk, is prevented.

Further objects and advantages may appear from the following detailed description having reference to the accompanying drawings, in which a preferred embodiment of the invention is illustrated, and in which:

Figure 1 is a vertical, mid-sectional side elevation of the machine, with the piston in its initial intake position in the cylinder and the inlet valve open and the outlet valve closed and the teat squeezer held in a non-squeezing position:

Figure 2 is a mid-sectional side elevation, similar to Figure 1, but with the piston in its terminal, squeezer-actuating position, the inlet valve closed and the outlet valve open, the teat receptacle holding a teat therein, and the teat squeezer in its extreme squeezing position against the teat receptacle:

Figure 3 is a plan of the machine with the parts in the positions shown in Figure 1, the cylinder and the head being broken away in order to show some interior parts more clearly;

Figure 4 is a view, taken along the line 4—4 in Figure 2, and showing the cylinder in end elevation, the rocker arm attached to the cylinder, and also sectionally the piston rod that slides in the rocker arm;

Figure 5 is a sectional view, taken along the line 5—5 in Figure 2 and showing the valves and their connecting means as well as the valve guides, and also parts of the valve-moving means as well as the spring means for returning the piston to its initial intake position in the cylinder; and Figure 6 is a view, taken along the line 6—6 in Figure 2 and showing the piston rod in section and the lever arm connected therewith as well as the spring means for urging the teat squeezer to its inclined position.

In the drawings the milking machine as a whole is indicated by the numeral 1. It comprises a frame 2, which may be provided with suitable means, such as straps 3 adapted to pass over, and to be buckled in place on a milking animal for securing the frame to the animal.

The frame is at one end provided with a clamp 4, which is adapted to be clamped over a cylinder 5 so as to secure the cylinder adjustably to the frame. At its end away from the frame the cylinder may be threaded for securing thereon a head 6, in which is an inlet-valve opening 7 and an outlet-valve opening 8, the inlet-valve opening 7 being adapted to seat therein an inlet valve 9, and the outlet-valve opening 8 being adapted to seat therein an outlet valve 10, and the arrangement of the valves being such that the inlet valve 9 opens away from the cylinder, and the outlet valve 10 opens toward and into the cylinder 5. The inlet valve 9 is secured upon or integral with a stem 11, which is adapted to reciprocate in a bearing 12 secured to the inside of a cylindrical tube-member 13 and arranged in a co-axial relation to the valve opening 7. This cylindrical member 13 is preferably formed integral with the head 6 and is adapted to be connected with any suitable fluid power-source, such as compressed air or any other fluid under pressure, for leading the fluid through the inlet opening 7 into the cylinder 5. The outlet valve 10 is secured upon or integral with a stem 14 and the stem is adapted to reciprocate in a bearing 15, which may be secured to the outside of the tubular member 13 or otherwise arranged integral with the head 6 in a co-axial relation to the valve opening 8.

For the purpose of moving the valves 9 and 10 in unison, the stems 11 and 14 are at their inner ends fixed in a connecting member 16, which serves further to maintain the co-axial relation of the valves to their respective seats. In Figures 1, 2 and 3 the length of valve movement is exaggerated in order to illustrate more clearly the valve action, but it should be understood that the valve movement is relatively small and only sufficient for delivering the proper quantity of fluid under pressure to the cylinder or for providing a comparatively unobstructed passage of the fluid therefrom.

The connecting member 16 is laterally provided with notches 17, and guide bars 18, extending integrally with the head 6 on the inside thereof, fit slidably in the respective notches so as to maintain the valves in coaxial relation to their respective seats during the valves' reciprocating movements to and from the seats. At its outer end the stem 14 is fixed to one end of another connecting member 19, the other end of which is fixed on the outer end of a rod 20, and the rod is slidably mounted in bearing blocks 21 and 22 so as to be parallel with the valve stems 11 and 14 and thus by its movement cause the valves to move freely to or from their respective seats.

In the cylinder 5 and adapted to reciprocate therein is a piston 23, preferably having a packing 24 of a suitable material secured thereto at its end toward the cylinder head 6. A specially shaped piston rod 25 is pivotally connected at its inner end, as shown at 26', with a member 26 on the piston, and is at its outer end pivotally connected, as shown at 27', with a member 27 on a teat squeezer 28. This teat squeezer preferably consists of a stiff board, which extends on both sides within the frame 2 and is at its top provided with a bar 29. In each side at the top of the frame are guides 30, which register with each other and in which the ends of the bar extend so as to allow the bar both a sliding and a pivotal movement therein. The guides 30 are preferably straight and virtually parallel with the axis of the cylinder 5 and terminate at the end away from the cylinder in upward extending portions 31, which are adapted to receive the respective ends of the bar therein and, when so received, to raise the teat squeezer therewith at the end of its sliding movement away from the cylinder. At its bottom the teat squeezer is provided with another bar 32, the ends of which extend in respective registering guides 33 in the frame so as to allow the bar to slide therein. Each of the guides 33 has an initial straight portion 34, parallel with the guides 30, and a terminal curved portion 35, which is inclined slightly downward from the straight portion, and the guides 33 are positioned in advance of the guides 30 toward the cylinder 5, so that the teat squeezer 28 is thereby adapted to be held initially with its top inclined away from the cylinder and to retain the same inclined position until the bar 29 reaches the terminal upward portions 31 in the guides 30 and the bar 32 at the same time reaches the curved portions 35 of the guides 33. The teat squeezer will then move pivotally around the bar 29 in the portions 31 and at the same time the bar 33 will follow the curved portions 35, so that from its inclined position the teat squeezer will gradually approach a right-angular position relative to the axis of the cylinder 5.

A receptacle 36 of a pliable material, such as rubber, for instance, and adapted to receive therein a teat 37, as shown in Figure 2, is suitably fastened at its top to the frame 2 and also under the bar 29 to the teat squeezer so as to be in the path defined by the squeezer's sliding and pivotal movement. The receptacle is open both at its top and bottom, and the latter is preferably contracted and has secured thereto an internally threaded ferrule 38 by which the receptacle is adapted to be connected with conveying means for leading milk from the receptacle to any suitable container. In order to squeeze the teat more efficiently the teat receptacle may have at its top, where it is attached to the teat squeezer, a thickened portion 39, also of rubber or other comparatively soft material that is not liable to injure a teat held in the receptacle.

The pivotal attachment at 27' of the piston rod 25 to the member 27 on the teat squeezer is, as is clearly shown in Figures 1 and 2, above the center of the teat squeezer. Consequently, the tendency of the piston 23 in its reciprocating movement toward the teat squeezer is to assist the guides 30 and 33 in holding the teat squeezer with its top inclined toward the receptacle. A spring 40,—hooked with one end to a pin 41 in the end of a lever arm 42, which is secured below the pivot 27' to the piston rod, and with its other end hooked over the bar 32 at the bottom of the teat squeezer,—further serves to draw the teat squeezer toward the lever arm and thus to urge the teat squeezer to its normally inclined position. The lever arm preferably comprises two matched members $a$ and $b$, which are on opposite sides of the piston rod and approximately midway are formed with an opening $c$. At its end the lever arm is bent away from the teat squeezer and is toward the teat squeezer provided with a flat portion $d$, which is adapted to abut the bottom of the member 27 so that, when the teat squeezer is urged by the spring 40 toward the lever arm, the flat portion $d$ prevents the teat squeezer from swinging beyond the inclined position that assures it a free sliding movement by the engagement of the bars 29 and 32 with the initial portions of the guides 30 and 33. Another spring 43, also attached with one end to the pin 41 and with its other end to a pin 44 at the end of a downward extension 45 integral with the bearing block 21, serves the purpose of normally holding the piston in its initial intake position in the cylinder.

Upon the piston rod are formed cams 46 and 47, the cam 46 being on the top of the piston rod and sloping upward toward the end where the piston rod is pivotally attached to the piston 23. This cam may be provided with a terminal portion 48 which is less sloping than the initial part of the cam. The cam 47 is on the underside of the rod and slopes downward toward the lever arm 42 at the other end of the rod.

In the top of the cylinder and at the end thereof toward the teat squeezer is mounted a rocker arm 49, which preferably consists of two similar metal strips 50 having spacing blocks 51 interposed between them, the strips and the blocks being secured to one another by any suitable means, such as rivets 52, in order to form a unitary member. The blocks 51 are so spaced from each other and are so shaped and also hold the strips 50 spaced from each other in such a manner as to allow the piston rod to move freely within the rocker arm. An elongated opening 53 in both strips serves to receive therethrough a screw 54 for pivotally and slidably fastening the rocker arm to a bracket 55, which is secured at the top of the cylinder and extends through a notch 56 so as to allow a free movement of the rocker arm within the notch, while a longer notch 57 in the bottom of the cylinder allows a free rocking and sliding movement of the rocker arm in and through the bottom.

The blocks 51 are so spaced from each other, and the shape of the piston rod and the rod's attachment to the piston are such that, when the piston is in its terminal position toward the teat squeezer, as shown in Figure 2, the upper block 51 will engage the terminal cam-portion 48 on the cam 46 and there will be only a slight play of the piston rod between the upper and the lower block. At the same time a hook portion 58 on the piston rod will engage the side of the lower block 51 and thus prevent the rocker arm from moving beyond its engaging position on the cam 46. Again, when the piston is at its initial intake position in the cylinder, as shown in Figure 1, the lower block 51 will engage the cam 47 on the piston rod, and at the same time the side of the block will engage another hook portion 59, formed on the rod for a purpose that will presently be explained.

On the rod 20 and between the bearing blocks 21 and 22 is suitably secured a collar 60, and on the rod and between the collar and the bearing block 21 is placed a spring 61, which normally urges the collar away from the bearing block and therewith also moves the rod 20 so as to close the inlet valve 9 and open the outlet valve 10. The rocker-arm strips 50 extend below the cylinder and hold the rod 20 between them so as to allow a relative freedom of movement between the rocker arm and the rod. Upon the rod and on each side of the rocker arm is placed a collar 62, provided with an enlarged opening therein in order to allow the collars to assume varying angular positions on the rod, which has further at a suitable place between the bearing block 22 and the rocker arm fixed thereupon a collar 63. An additional collar 64, which is of such a diameter that it is adapted to move freely in the opening c of the rocker arm, is fixed on the rod at its end toward the teat squeezer, and a spring 65 is placed on the rod and between the fixed collar 63 and the movable collar 62 nearest thereto at the side of the rocker arm, while another spring 66 is placed between the end collar 64 and the other collar 62 on the other side of the rocker arm.

At the end and to the outside of one of the strips 50 is secured a block 67. A spring 68 is fixed to the cylinder and is so shaped that it is out of the path of the lower block 51 in the rocker arm and is unopposed to the block 67 when the rocker arm is uninfluenced by the lifting action resulting from the engagement of its upper block 51 with the cam 46 on the piston rod. The free end of this spring is adapted to engage an upper, reduced portion 69 on the block 67 as soon as the rocker arm is sufficiently influenced by the lifting action to place the block 67 in the path of the spring. Another spring 70, similar to the spring 68 but oppositely disposed thereto, is also fixed to the cylinder and is so shaped and placed that it is out of the path of the block 67 and is unopposed to the lower block 51 when the rocker arm is uninfluenced by the lowering action resulting from the engagement of its lower block 51 with the cam 47 on the piston rod. As soon as the rocker arm is sufficiently influenced by the lowering action to place the lower block 51 in the path of the spring 70, the free end of the spring is adapted to engage a lower, reduced portion 71 on the block. Either of the springs 68 and 70 will thus allow the rocker arm to slide over it when the rocker arm is moved in the direction of the free end of the spring, but it will oppose such a sliding movement when the respective spring comes into engagement with the reduced portion of the respective block 67 or 51.

When the milking machine 1, constructed as described, is attached to a milch animal so that one of the animal's teats 37 is held in the receptacle 36, as shown in Figure 2, and when the admission of fluid to the tubular member 13 from the power source is effected by a suitable valve means, which is not shown since it is common in the art and is not a part of this invention, the piston in the cylinder will be in the initial intake position toward the cylinder head 6. In this position of the piston the teat squeezer is in its initial inclined position, as shown in Figure 1, and the cam 47 on the piston rod engages the lower block 51 in the rocker arm, while the rod's hook portion 59, assisted by the engagement of the spring 70 with the reduced portion 71 of the lower block 51, forces the rocker arm to an extreme, inclined position in which it compresses the spring 65 against the collar 63 on the rod 20, thus also causing the collar 60 on the rod to compress the spring 61 against the bearing block 21 and the rod 20 by means of the connecting members 19 and 16 to move the inlet valve 9 away from the valve opening 7 while the outlet valve 10 is seated in the valve opening 8. The fluid entering through the inlet valve opening will thus force the piston toward the other end of the cylinder and thereby communicate a sliding motion to the teat squeezer. In this manner the teat squeezer presses upon the receptacle 36, thus gradually squeezing the teat from its root by means of the thickened portion 39 on the receptacle, so as to prevent the back-flow of milk in the teat, and during its squeezing movement retaining the teat squeezer in its inclined position, until the upper bar 29 thereon reaches the upward extending portions 31 of the guides 30. From this position the teat squeezer, with the bar 29 for its pivot and prevented from a backward movement by the edges at the extensions 31 and the straight portions of the guides 30, and the lower bar 32 on the teat squeezer following the curved portions 35 of the guides 33, will swing so as to press upon the teat receptacle until the teat squeezer assumes its terminal squeezing position, as shown in Figure 2.

During the squeezing movement, which is accomplished gently and without undue haste so as not to hurt the milch animal, the rocker arm is gradually released from its engagement with the cam 47, and the cam 46 in its stead comes into engagement with the upper block 51 in the rocker arm. Soon afterward the block reaches the terminal portion 48 on the cam, and the rocker arm at the same time comes into engagement with the hook portion 58 on the piston rod, so that, while the rocker arm is lifted out of engagement with the free end of the spring 70, it is also by its engagement with the hook portion caused to swing back over the spring to a position in which the free end of the spring 68 is adapted to engage the reduced portion 69 on the block 67. The rocker arm is then in a position for being held by the spring 68 while the spring 66 is compressed and the springs 61 and 65 are expanded, thus sliding the rod 20 in the direction of the teat squeezer so as to cause the inlet valve to close and the outlet valve to open. By this action the spring 43, which has a considerably greater power than the springs 61 and 65 combined and therefore overcomes their resistance, in its turn forces the piston again to move to its initial intake position, thus expelling the imprisoned fluid through the outlet valve and returning the teat squeezer to its non-squeezing position. The operation may then be repeated until a sufficient quantity of milk has been drawn from the teat.

It is evident that, although I have shown a milking machine adapted to hold only one teat therein for drawing milk therefrom, I may combine any number of teat receptacles with an equal number of teat squeezers in the manner described for the operation of one teat squeezer and thereby effect the squeezing of milk from more than one teat of a milch animal at a time.

I claim as my invention:

1. A milking machine comprising a frame adapted to be attached to a milch animal; a pliable receptacle secured to the frame and adapted to receive a teat therein; a cylinder secured to the frame and provided with an inlet and an outlet at one end of the cylinder, the inlet being adapted to be connected with a fluid power-source; valves, respectively, for the inlet and the outlet; a reciprocating piston in the cylinder; upper and lower guides in the frame; a piston rod pivotally connected at one end with the piston; a teat squeezer pivotally connected with the piston rod at the other end thereof and at its top secured to the top of the recepacle and being slidably and pivotally connected with the upper guides and at its bottom slidably connected with the lower guides, the squeezer's pivotal connection with the piston rod being such as to incline the squeezer with its top toward the receptacle and thereby initially squeezing the teat adjacent to the root thereof and successively squeezing the teat to its end so as to draw a quantity of milk from the teat and at the same time prevent back-flow of milk therein; means for closing the inlet valve and opening the outlet valve at a predetermined position of the piston; and means for automatically returning the piston to the initial intake position and therewith also the squeezer to a non-squeezing position.

2. A milking machine comprising a frame adapted to be attached to a milch animal; a pliable receptacle secured to the frame and adapted to receive a teat therein; a cylinder secured to the frame and provided with an inlet and an outlet at one end of the cylinder, the inlet being adapted to be connected with a fluid power-source; valves, respectively, for the inlet and the outlet; a reciprocating piston in the cylinder; upper and lower guides in the frame; a piston rod pivotally connected at one end with the piston; a teat squeezer pivotally connected with the piston rod at the other end thereof and at its top secured to the top of the receptacle and being slidably and pivotally connected with the upper guides and at its bottom slidably connected with the lower guides, the squeezer's pivotal connection with the piston rod being such as to incline the squeezer with its top toward the receptacle and thereby initially squeezing the teat to its end so as to draw a quantity of milk from the teat and at the same time prevent back-flow of milk therein; spring means for urging the squeezer to the inclined position; means for closing the inlet valve and opening the outlet valve at a predetermined position of the piston; and means for automatically returning the piston to the intial intake position and therewith also the squeezer to a non-squeezing position.

3. A milking machine comprising a frame adapted to be attached to a milch animal; a pliable receptacle secured to the frame and adapted to receive a teat therein; a cylinder secured to the frame and provided with an inlet and an outlet at one end of the cylinder, the inlet being adapted to be connected with a fluid power-source; valves, respectively, for the inlet and the outlet, the valves being oppositely disposed and slidably movable in unison, so that, when one valve is seated, the other valve is open; a reciprocating piston in the cylinder; a piston rod pivotally connected at one end with the piston; a teat squeezer pivotally connected with the piston rod at the other end thereof and adapted to be moved by the piston for squeezing the teat so as to draw a quantity of milk therefrom; a slidably and pivotally mounted rocker arm adapted to engage the piston rod; means connected with the rocker arm and with the valves for moving the valves to or from their respective seats; spring means for actuating the valve-moving means; stop means engaging the rocker arm so as to prevent the valve-moving means from being actuated before the piston reaches its terminal positions; cams on the piston rod for engaging the rocker arm and moving is so as to allow the spring means to actuate the valve-moving means when the piston is in its terminal positions; and spring means for automatically returning the piston to the initial intake position and therewith also the squeezer to a non-squeezing position.

4. A milking machine comprising a frame adapted to be attached to a milch animal; a pliable receptacle secured to the frame and adapted to receive a teat therein; a cylinder secured to the frame and provided with an inlet and an outlet at one end of the cylinder, the inlet being adapted to be connected with a fluid power-source; valves, respectively, for the inlet and the outlet, the valves being oppositely disposed and slidably movable in unison, so that, when one valve is seated, the other valve is open; a reciprocating piston in the cylinder; a piston rod pivotally connected at one end with the piston; a teat squeezer pivotally connected with the piston rod at the other end thereof and adapted to be moved by the piston for squeezing the teat so as to draw a quantity of milk therefrom; a slidably and pivotally mounted rocker arm adapted to engage the piston rod; means connected with the rocker arm and with the valves for moving the valves to or from their respective seats; spring means for actuating the valve-moving means; stop means engaging the rocker arm so as to prevent the valve-moving means from being actuated before the piston reaches its terminal positions; cams on the piston rod for engaging the rocker arm and moving it so as to allow the spring means to actuate the valve-moving means when the piston is in its terminal positions; hook portions on the piston rod for engaging the rocker arm at its extreme cam-engaged positions and co-operating with the spring means in actuating the valve-moving means when the piston is in its terminal positions; and spring means for automatically returning the piston to the initial intake position and therewith also the squeezer to a non-squeezing position.

5. A milking machine comprising a collapsible member, means for collapsing said member, and then for permitting said member to regain its normal position, said means including a piston, a cylinder for receiving said piston, said cylinder having an inlet and an outlet port, a piston rod and connections between said piston rod and said ports, for controlling the movements of said piston, said connections including an arm swingable into two positions by the movement of said piston rod, and means for locking said arm in its two positions, said arm being released from locked position by the movement of said pistion rod when said piston has moved a predetermined distance.

EDWARD A. ENGLUND.